United States Patent
Jooste

(10) Patent No.: US 7,475,423 B2
(45) Date of Patent: *Jan. 6, 2009

(54) PROTECTED EXECUTION ENVIRONMENTS WITHIN A COMPUTER SYSTEM

(75) Inventor: Sarel Kobus Jooste, Pretoria (ZA)

(73) Assignee: Dell Marketing USA, L.P., Round Rock, TX (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/106,942

(22) Filed: Apr. 15, 2005

(65) Prior Publication Data

US 2005/0188422 A1  Aug. 25, 2005

Related U.S. Application Data

(63) Continuation of application No. 09/545,286, filed on Apr. 7, 2000, now Pat. No. 6,941,470.

(51) Int. Cl.
*G06F 7/04* (2006.01)

(52) U.S. Cl. ................... 726/4; 726/3; 726/18; 726/21; 713/151; 713/182

(58) Field of Classification Search ........................ None
See application file for complete search history.

(56) References Cited

U.S. PATENT DOCUMENTS

| | | | | |
|---|---|---|---|---|
| 6,026,402 A * | 2/2000 | Vossen et al. | ................... | 707/9 |
| 6,941,470 B1 | 9/2005 | Jooste | | |
| 2005/0182964 A1 | 8/2005 | Jooste | | |
| 2005/0183137 A1 | 8/2005 | Jooste | | |
| 2005/0188227 A1 | 8/2005 | Jooste | | |

OTHER PUBLICATIONS

"U.S. Appl. No. 11/106,832, Non-Final Office Action mailed Mar. 11, 2008", OARN,8 pgs.
"U.S. Appl. No. 11/106,832,Response filed-Jun. 9, 2008 to Non Final Office Action mailed Mar. 11, 2008", 10 pgs.
"U.S. Appl. No. 11/106,951 Non-Final Office Action mailed Mar. 11, 2008", OARN,10pgs.
"U.S. Appl. No. 11/107,018 Non-Final Office Action mailed Mar. 11, 2008", OARN,10 Pgs.

* cited by examiner

*Primary Examiner*—Kambiz Zand
*Assistant Examiner*—Roderick Tolentino
(74) *Attorney, Agent, or Firm*—Schwegman, Lundberg & Woessner, P.A.

(57) ABSTRACT

A protected execution agent installs itself within a file system manager on the computer to control modifications to a protected execution environment by intercepting I/O requests from applications. If an unauthorized application attempts to modify the protected execution environment, the protected execution agent terminates the original I/O request and creates a redirect I/O request that specifies a corresponding directory path within an alternate environment. The requested I/O operation is a carried out by the file system against the alternate environment. A configuration utility is responsible for determining which installed applications are authorized to change the protected execution environment. The configuration utility also establishes a parent-child relationship between an unauthorized application that invokes or "spawns" an authorized application, with the authorized child application being considered unauthorized when performing processes on behalf of the unauthorized parent application.

24 Claims, 5 Drawing Sheets

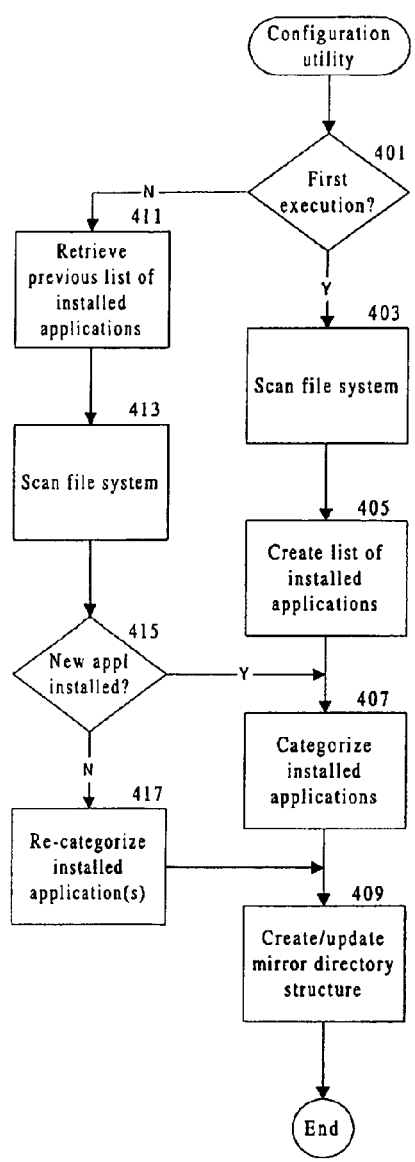
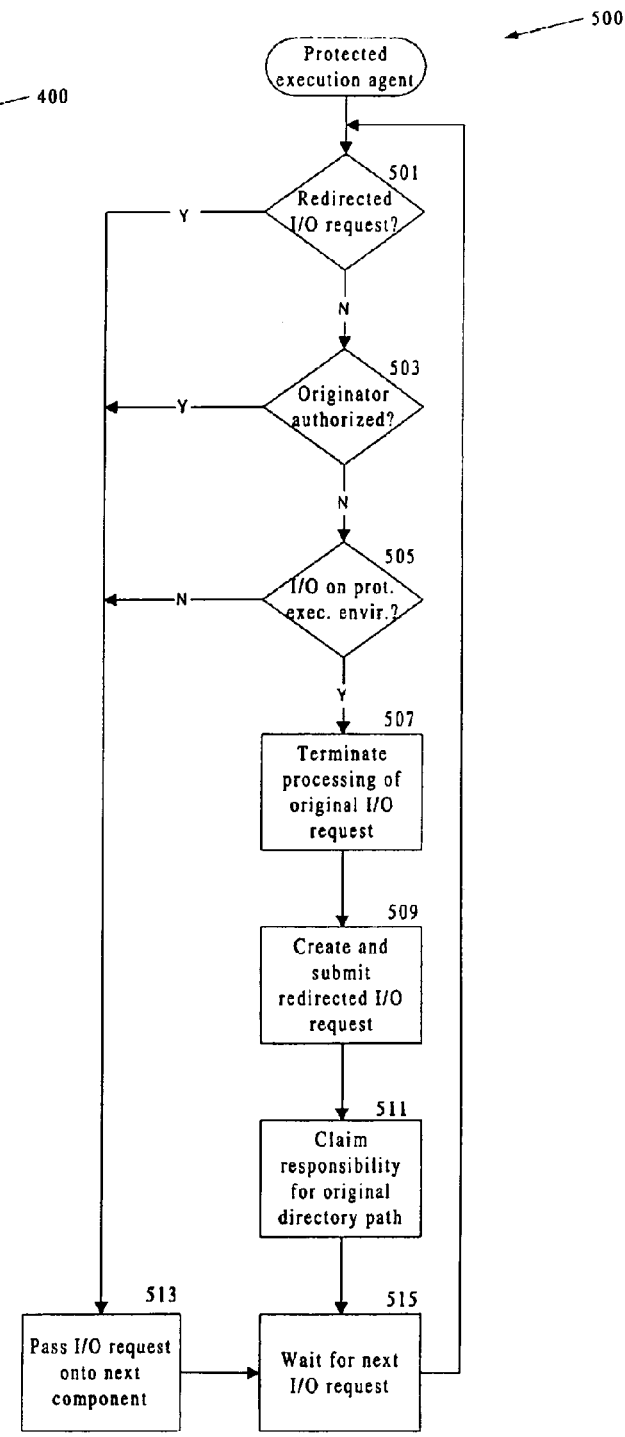
FIG. 4
FIG. 5A

PROTECTED EXECUTION ENVIRONMENTS WITHIN A COMPUTER SYSTEM

CLAIM OF PRIORITY

This application is a Continuation of U.S. application Ser. No. 09/545,286 filed Apr. 7, 2000, now U.S. Pat. No. 6,941,470, which is incorporated herein by reference.

FIELD OF THE INVENTION

This invention relates generally to computer operating environments, and more particularly to protecting such an operating environment from modification.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Everdream Corporation, All Rights Reserved.

BACKGROUND OF THE INVENTION

Technical support for personal computer systems, whether owned by a business or by an individual, is complicated by the installation of new application programs that frequently overwrite components or settings required by already-installed applications, causing the older applications to fail. Such failures can sometimes be remedied using diagnostic software that removes the newly installed application and the reinstates the original version of the components or settings. However, the user then is left without the features offered by the new application.

One solution to the problem of conflicting applications is to prohibit the user from installing new applications or new versions of installed applications into a stable operating environment, but that solution is unacceptable to most users. An alternate solution is disclosed in U.S. patent application Ser. No. 09/418,697 titled METHOD AND APPARATUS FOR CONFIGURING A HARD DISK AND FOR PROVIDING SUPPORT FOR A COMPUTER SYSTEM filed on Oct. 15, 1999 and assigned to the same assignee as the present application. The invention in the Ser. No. 09/418,697 application partitions the hard disk on a computer with a stable operating environment into separate logical environments, one of which represents the stable operating environment and is protected from subsequent user modifications. Applications installed after the partitioning are written to one of the logical environments that permits user modifications. Only one of the environments is active on the computer at a time. Thus, when the user wants to execute an application that is resident in an inactive environment, the computer terminates the active environment and switches to the environment that contains the requested application.

Because some users may find the switch confusing, there exists a need to protect a stable operating environment from modifications while allowing the user to install and execute new applications without the necessity of switching active environments.

SUMMARY OF THE INVENTION

The above-mentioned shortcomings, disadvantages and problems are addressed by the present invention, which will be understood by reading and studying the following specification.

Each application installed on the computer is classified as authorized or unauthorized. The directory paths for authorized applications form a protected execution environment Only input/output (I/O) requests from authorized applications are allowed to change the protected execution environment A protected execution agent installs itself within a file system manager on the computer to control modifications to the protected execution environment by intercepting I/O requests from applications. If an unauthorized application attempts to modify the protected execution environment, the protected execution agent terminates the original I/O request and creates a redirected I/O request that specifies a corresponding directory path for the file within an alternate environment. The file path in the alternate environment corresponds to the file path in the original I/O request. The protected execution agent then submits the redirected I/O request to the file system manager. When the protected execution agent intercepts the redirected request, it recognizes the request as its own and allows the request to continue onto the appropriate file system driver for processing. The file system driver then performs the requested I/O operation against the corresponding directory. Consequently, when an unauthorized application attempts to store a file in a directory within the protected execution environment, the file is instead stored in the corresponding directory. Because the application is unaware of the change, subsequent I/O requests for that file continue to specify the path in the protected execution environment. The protected execution agent intercepts each such subsequent request and submits a redirected I/O request that specifies the corresponding directory. Thus, the present invention "virtualizes" I/O requests from unauthorized applications that are directed to the protected environment.

In one aspect, a configuration utility scans the file system and creates a list of all installed applications. The list is then evaluated to categorize the installed applications as authorized or unauthorized A special "mirror" directory structure is created that mimics the directory paths of the authorized applications, with the executable file for each authorized application being represented as a null file entry within the mirror directory structure. The protected execution agent queries the file system manager for the corresponding executable in the mirror directory structure when it needs to determine if an application is authorized. If the file system manager indicates that the executable exists, the application is authorized. The configuration utility can be run when a new application is installed or at any point to change the category of an application.

In another aspect, the protected execution agent establishes a parent-child relationship between an unauthorized application that invokes or "spawns" an authorized application to perform some process on behalf of the unauthorized application. All subsequent I/O requests from the authorized child application are treated as if they were submitted by the unauthorized parent application until the parent-child relationship is terminated.

The present invention describes systems, clients, servers, methods, and computer-readable media of varying scope. In

BRIEF DESCRIPTION OF THE DRAWINGS

FIG. 4 is a flowchart of a configuration utility method to be performed by a computer to according to an embodiment of the invention; and FIGS. 5A and 5B are flowcharts of a protected execution agent method to be performed by a computer to according to an embodiment of the invention.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described In the second section, a system level overview of the invention is presented. In the third section, methods for an embodiment of the invention are described. Finally, in the fourth section, a conclusion of the detailed description is provided.

Operating Environment

Figure 1:
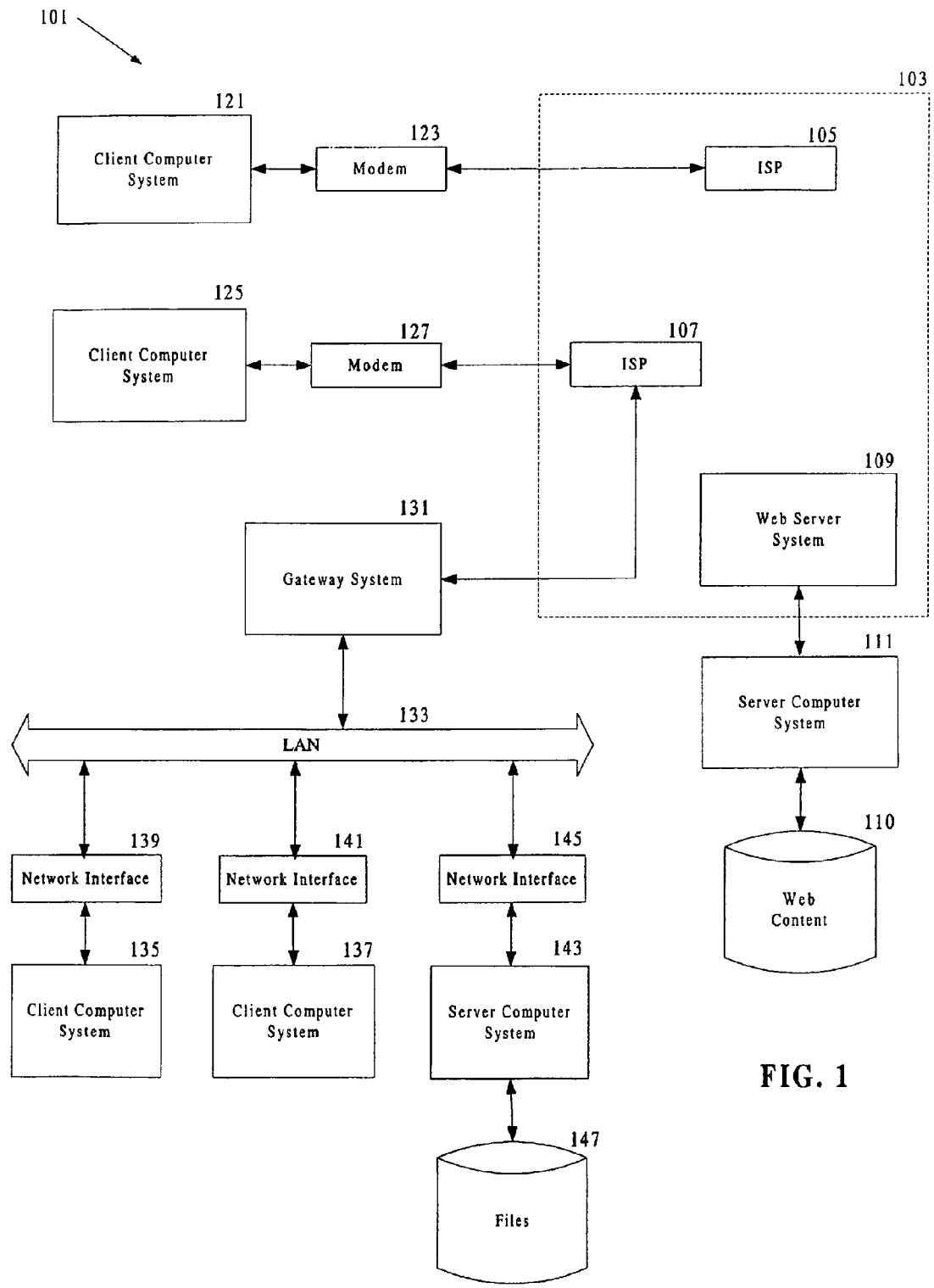
FIG. 1 is a diagram of one embodiment of an operating environment suitable for practicing the present invention.
Figure 2:
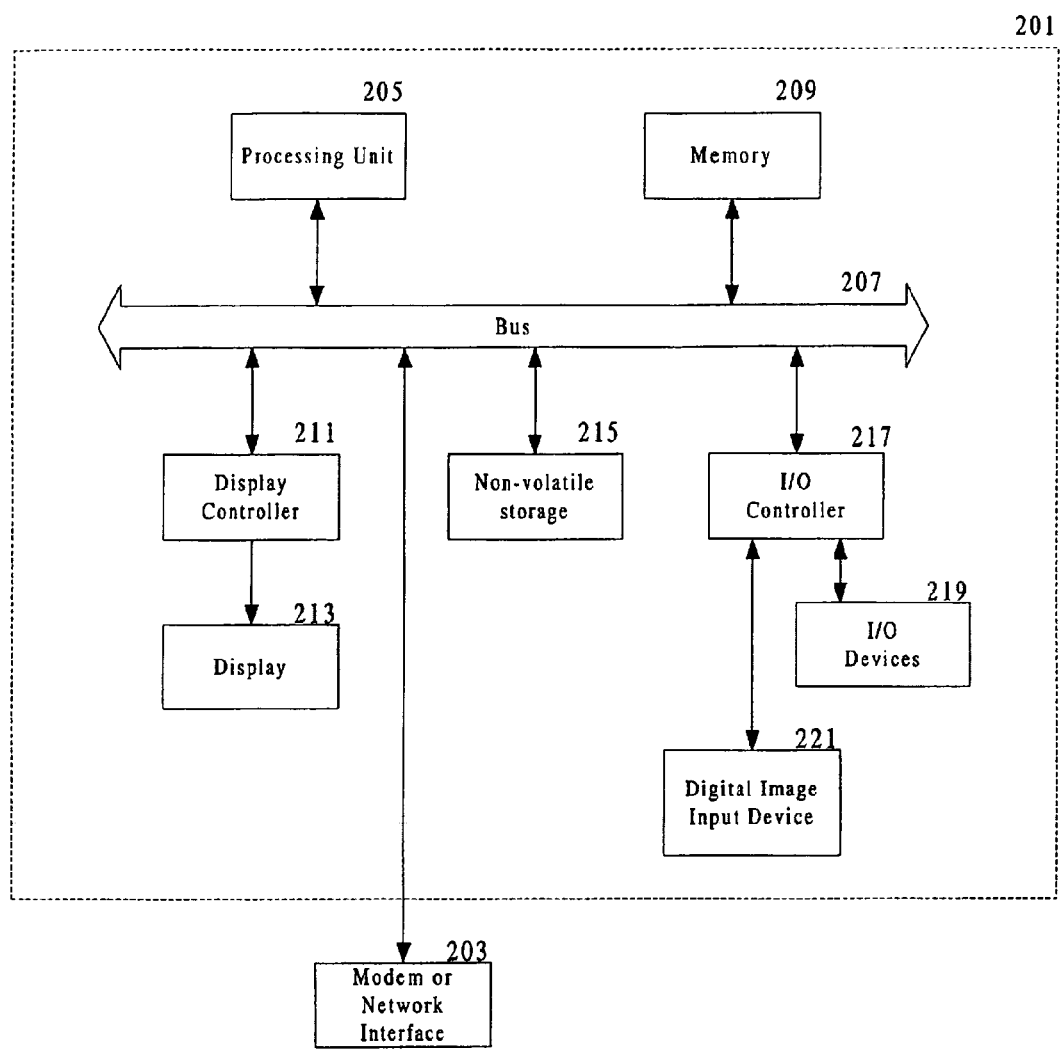
FIG. 2 is a diagram of one embodiment of a computer system suitable for use in the operating environment of FIG. 1.

The following description of FIGS. 1 and 2 is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems that are coupled together through a network 103, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML formal These documents are often provided by web servers, such as web server 109 which is considered to be "on" the Internet. Often these web servers are provided by the ISPs, such as ISP 105, although a computer system can be set up and connected to the Internet without that system being also an ISP as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to the server computer system 111 which itself is coupled to web content 110, which can be considered a form of a media database. It will be appreciated that while two computer systems 109 and 111 are shown in FIG. 2, the web server system 109 and the server computer system 111 can be one computer system having different software components providing the web server functionality and the server functionality provided by the server computer system 111 which will be described further below.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer system, a network computer, a WebTV system, or other such computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 1 shows the interfaces 123 and 127 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 135 and 137 are coupled to a LAN bus 133 through network interfaces 139 and 141, which can be Ethernet network or other network interfaces. The LAN bus 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Alternatively, as well-known, a server computer system 143 can be directly coupled to the LAN bus 133 through a network interface 145 to provide files 147 and other services to the clients 135, 137, without the need to connect to the Internet through the gateway system 131.

FIG. 2 shows one example of a conventional computer system that can be used as a client computer system or a server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to non-volatile storage 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The non-volatile storage 215 is often a magnetic hard disk, an optical disk, or another form of storage for large amounts of data Some of this data is often written, by a direct memory access process, into memory 209 during execution of software in the computer system 201. One of skill in the art will immediately recognize that the term "computer-readable medium" includes any type of storage device that is accessible by the processor 205 and also encompasses a carrier wave that encodes a data signal.

It will be appreciated that the computer system 201 is one example of many possible computer systems which have different architectures. For example, personal computers based on an Intel microprocessor often have multiple buses, one of which can be considered to be a peripheral bus. Network computers are another type of computer system that can be used with the present invention. Network computers do not usually include a hard disk or other mass storage, and the executable programs are loaded from a network connection into the memory 209 for execution by the processor 205. A WebTV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the family of operating systems known as Windows from Microsoft Corporation of Redmond, Wash., and their associated file management systems. The file management system is typically stored in the non-volatile storage 215 and causes the processor 205 to execute the various acts required by the operating system to input and output data and to store data in memory, including storing files on the non-volatile storage 215.

System Level Overview

A system level overview of the operation of an embodiment of the invention is described by reference to FIG. 3. When application software is installed on a computer system, the executables and supporting files are stored on non-volatile storage in a directory or directories arranged in a hierarchical tree structure. Because multiple applications can share executables, the installation of one application may overwrite a shared executable previously stored by a previously installed application, causing the earlier installed application to fail. Additionally, many operating systems maintain a configuration file or "registry" in which various settings for the installed applications are recorded and the settings for a later installed application may conflict with those of an earlier installed application.

Figure 3:
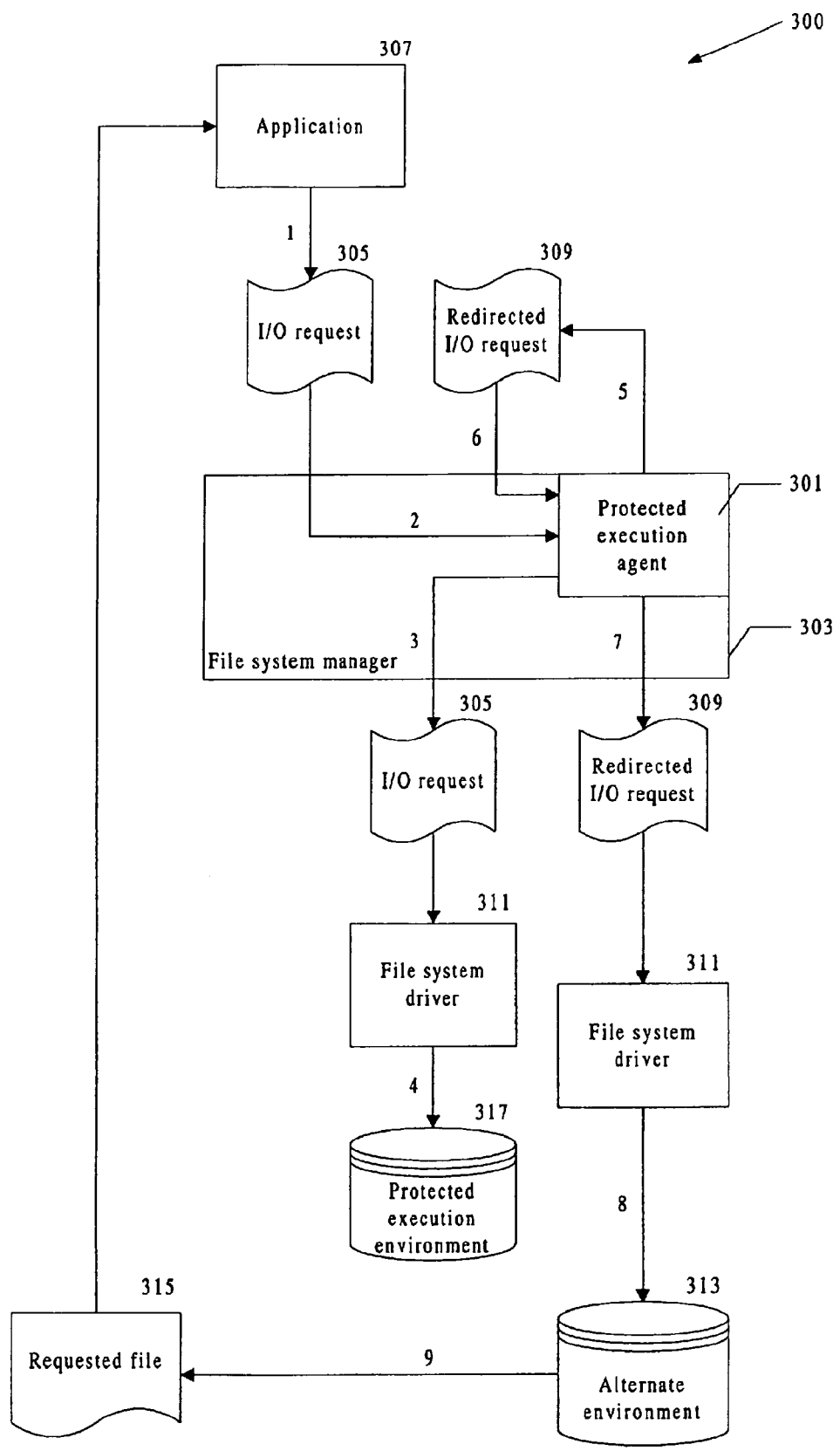
FIG. 3 is a diagram illustrating a system-level overview of an embodiment of the invention.

FIG. 3 illustrates a computer system 300 in which the present invention protects executables and files for a predetermined set of applications from being modified by later installed applications. The predetermined set of applications are classified as authorized; all other applications are classified as unauthorized. The directory paths for the authorized applications form a protected execution environment 317 (shown generically as hard disk 317) that only authorized applications are allowed to change. A protected execution agent 301 is installed into a file system manager 303 to control modifications to the protected execution environment 317 by intercepting input/output (I/O) requests from all applications 307.

When an application 307 issues 1 a file I/O request 305, the protected execution agent 301 intercepts 2 the request 305 and determines if the application 307 is authorized. If so, the protected execution agent 301 allows the I/O request 305 to continue 3 onto the appropriate file system driver 311 without taking any action. The file system driver 311 then performs 4 the requested I/O operation against the specified directory in the protected execution environment 317.

On the other hand, if the application 307 is unauthorized and is attempting to modify the protected execution environment 317, the protected execution agent 301 does not allow the original I/O request 305 to continue on, essentially terminating the original I/O request 305. The protected execution agent 301 creates a redirected I/O request 309 that specifies a directory path in an alternate environment (illustrated generically as hard disk 313) as a substitute for the original I/O request 305. The protected execution agent 301 then submits 5 the redirected I/O request 309 to the file system manager 303 and registers itself with the file system manager 303 as responsible for the original directory path. When the protected execution agent 301 intercepts 6 the redirected I/O request 309, it recognizes the request as its own and allows the redirected I/O request 309 to continue 7 onto the appropriate file system driver 311 for processing. The file system driver 311 consequently performs 8 the requested I/O operation against the alternate environment 313.

Thus, when an unauthorized application 307 attempts to store a file 315 in a directory in the protected execution environment 317, the file 315 is instead stored in the corresponding directory in the alternate environment 313. However, subsequent I/O requests 305 for the file 315 continue to specify the original directory path in the protected execution environment 317 since the application 307 is unaware of the change. Because the protected execution agent 301 has registered for the original directory path, each subsequent I/O request 305 is delivered directly to it and it submits the corresponding redirected I/O request 309 to the file system manager 303 as described above. When the redirected I/O request 309 is processed 8 by the file system driver 311, the file system driver 311 retrieves 9 the file 315 from the corresponding directory in the alternate environment 313 for subsequent processing by the application 307.

The system level overview of the operation of an embodiment of the invention has been described in this section of the detailed description. A protected execution agent intercepts I/O requests from applications and permits only authorized applications to modify a protected execution environment. Attempts to modify the protected execution environment by unauthorized applications are directed to an alternate environment. The alternate environment serves as a "virtualization" environment to hold files for unauthorized applications that cannot be stored in the protected environment because of their potential for conflict with files for authorized applications. The protected execution agent acts as a "virtualization" agent, causing I/O requests from the unauthorized applications to be directed to the virtualization environment without having to change the programming of the unauthorized applications.

While the invention is not limited to any particular number of environments, for sake of clarity a simplified arrangement of one protected execution environment and one alternate environment has been described. It will be appreciated also that the environments have been represented in FIG. 3 as separate hard disks but that the invention does not require the environments to be physically separate.

The present invention is particularly useful to organizations that support multiple computer users. The support organization would configure the protected execution environment to include only directories for supported (authorized) applications before delivering the computer to the user. Whenever the computer is booted, the protected execution agent is installed in the file system and prevents the user from installing unsupported (unauthorized) applications into the directories for supported (authorized) applications, thereby reducing the likelihood of failure of the supported applications.

Furthermore, by establishing a global set of supported applications, the support organization can maintain a master version of the protected execution environment for multiple computers and use the master version to replace a corrupted protected execution environment on a computer without having to perform lengthy diagnostic analysis to determine the cause of the failure. In situations in which the computers are remote from the support organization, a copy of the master version of the protected execution environment may be stored in a secured area on each computer and the remote support organization can use a network connection to copy the master version over a corrupted version. Alternatively, a network connection can be used to download the master version to the problem computer to overwrite the corrupted version.

METHODS OF EMBODIMENTS OF THE INVENTION

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Referring first to FIG. 4, the acts to be performed by a computer executing a configuration utility method 400 are shown. The utility method 400 is performed whenever a support provider, such as a system administrator or a remote support organization, wants to classify the applications installed on a computer as authorized (supported) or unauthorized (unsupported) to configure the protected execution environment. In such situations, the user of the computer is prevented from executing the utility method 400 through conventional security techniques. It will be apparent that such restrictions are not necessary when the computer is a stand-alone system and the user is acting in the capacity of a systems administrator.

If this is the first execution of the method 400 (block 401), the method 400 scans the file system of the computer to determine all installed applications (block 403) and creates a list (block 405). The installed applications are categorized as authorized or unauthorized (block 407). In one embodiment, a user manually categorizes the applications. In another embodiment, the categories are automatically assigned based on a master list of authorized applications.

The protected execution environment is defined by the directory paths for the authorized applications. In one embodiment, the utility user can manually alter the directory structure of the protected execution environment as part of the processing of block 407. In an alternate embodiment, alternations to the directory structure for the protected execution environment are input as parameters to the utility method 400. One of skill in the art will immediately perceive that the alternate environment can also be created by the configuration utility from the directory paths of the unauthorized applications although such an embodiment is not shown.

A special "mirror" directory structure is created that mimics the directory structure of the protected execution environment (block 409). Each executable file for an authorized application appears as a null entry in the appropriate directory in the mirror directory structure. In an alternate embodiment, non-executable files in the protected execution environment may also have corresponding null entries in the mirror directory structure. The mirror directory structure is distinguished from the directory structure of the protected execution environment by prefixing each directory path in the system with a unique top level directory name. For example in a Microsoft Windows environment, the mirror directory structure that corresponds to the standard Windows directory structure of "c:\windows" may be "c:\everdreamagentprocess\windows" so that the null entry for the Windows main executable is found at "c:\everdreamagentprocess\windows\win.exe."

On each subsequent execution, the utility method 400 retrieves the previous list of installed applications (block 411), scans the file system (block 413), and determines if a new application has been installed since the last execution of the utility (block 415). If so, the new application(s) is categorized as authorized or unauthorized (block 407). If no new applications have been installed, one or more of the previously installed applications are re-categorized (block 417), either manually or automatically as described above. In either case, the directory structure of the protected execution environment changes and mirror directory structure is updated to reflect the change (block 409). It will be appreciated that the utility method 400 can also be executed with parameters that indicate changes in the category of a previously installed application so that a scan of the file system is unnecessary.

Figure 5B:
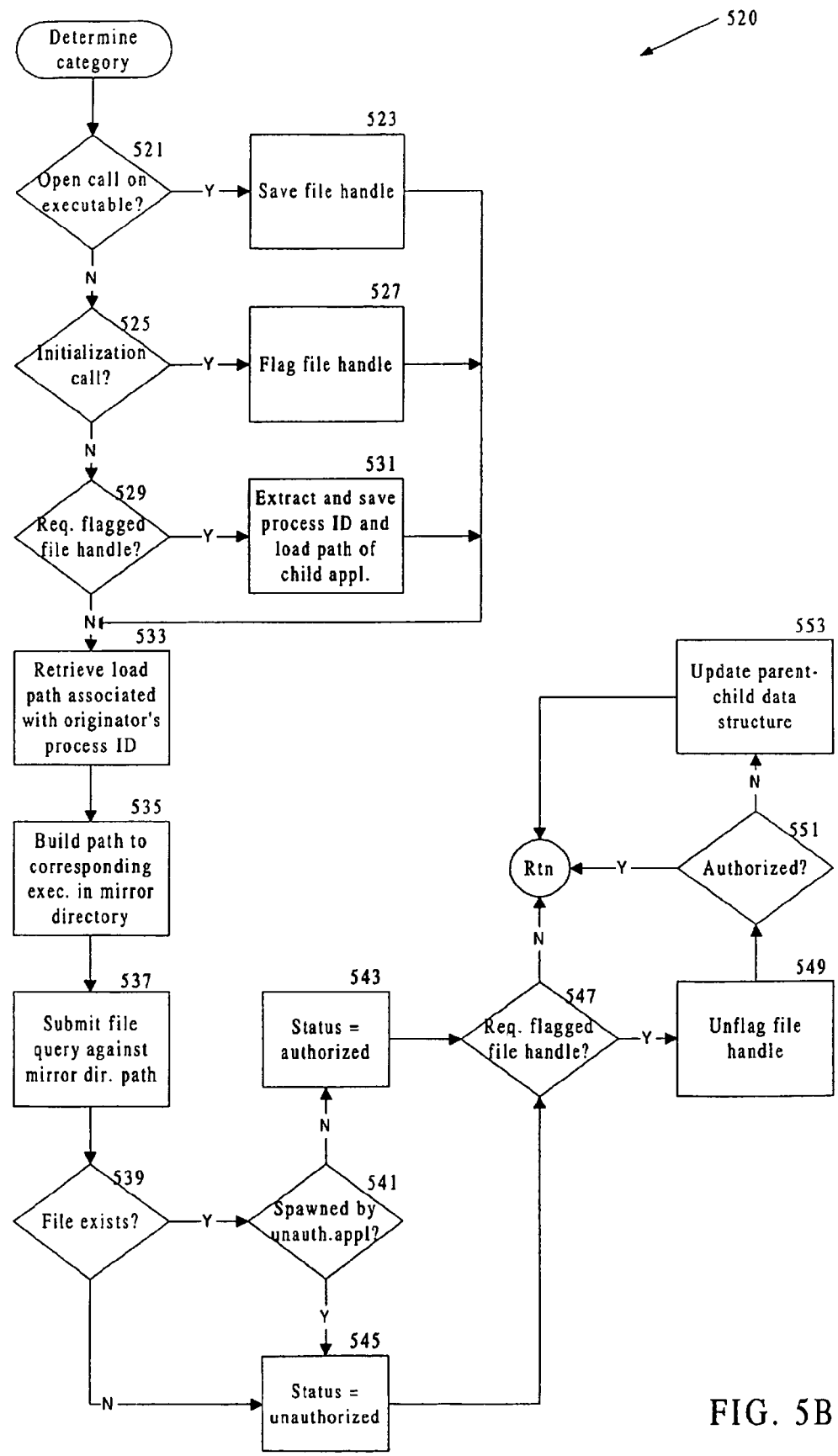

FIGS. 5A-B illustrate methods that performs the processes for one embodiment of the protected execution agent 301 after it has been installed in a file system manager. It will be appreciated that the particulars of installation depend on the operating system of the computer. For example, in a computer running Windows 98, the protected execution agent 301 is a virtual device driver (VxD) and is coupled into a "hook chain" for the Windows installable file system so that the protected execution agent receives all I/O requests ahead of the other VxDs in the hook chain.

In the embodiment illustrated in FIG. 5A, when the protected execution agent method 500 intercepts an I/O request, it determines if the request is a redirected I/O request that it created (block 501). If so, the method 500 passes the request onto the next component for processing (block 513) and then waits for another I/O request (block 515). The next component is determined by the file and operating systems of the computer so that, for example, if the method 500 is for a protected execution agent executing under Windows 98, the appropriate component is the next VxD in the installable file system hook chain. In this fashion, other utilities that install themselves in the file system manager, such as virus scanners, operate against a file in the alternate environment without having to be aware of the configuration of the computer created by the invention.

If the I/O request is not a redirected request, the method 500 determines if the application is authorized (block 503). In one embodiment, the load path of the application, i.e., the directory path for the application executable, is used to determine if the application is authorized as described in detail below with reference to FIG. 5B. It will be appreciated that other techniques can be used to designate the category of an application and are contemplated as within the scope of the invention.

If the application is authorized, the method 500 passes the original I/O request onto the next component (block 513) and waits for another I/O request (block 515). On the other hand, if the application is unauthorized, the method 500 determines if the I/O request was issued against the protected execution environment (block 505). If so, it terminates the original I/O request (block 507), creates a redirected I/O request directed at the corresponding directory and submits the redirected I/O request to the file system (block 509). An alternate embodiment redirects each I/O request issued by an unauthorized application, even if the directory path specified is not part of the protected execution environment. If the corresponding directory does not exist, at block 507 the original directory path is used to create a corresponding directory path in the alternate environment.

The method 500 also claims responsibility for the original directory path so that all subsequent I/O requests will be passed immediately to the protected execution agent for processing (block 511). In an alternate embodiment, the agent method 500 claims responsibility for all directory paths in the protected execution environment when first installed in the file system.

In most operating environments, each instance of an executing application is assigned a process identifier and each I/O request issued by an application contains its process identifier. However the operating system may not maintain a relationship between the process identifier for an application and its load path. Therefore, additional processing may be necessary to associate the load path and the process identifier when the load path is used to determine if the application is authorized or unauthorized FIG. 5B illustrates one embodiment of a method 520 that creates and maintains the relationship between a process identifier and the load path for an application and uses that relationship to determine the category of the application. The embodiment in FIG. 5B assumes a particular ordering of I/O requests will occur when an application is executed. One of skill in the art will immediately conceive of alternate embodiments that rely on a different order of I/O requests upon reading the following description of the processing represented by FIG. 5B. The method 520 illustrated in FIG. 5B also creates and maintains an active process data structure that associates a process identifier for an application with its load path and a parent-child data structure that tracks the relationship between an unauthorized application that spawns an authorized application. These data structures are created when an application is executed as described in detail further below.

When the protected execution agent method 500 intercepts an original I/O request, it calls the method 520 to determine if the application issuing the request is authorized. Assuming for the moment that the originating application is not spawning another application, control falls through to block 533 which retrieves the load path from an active process data structure using the process identifier of the originating application. The load path is used to create the corresponding path in the mirror directory (block 535). The method 520 submits a query on the mirror directory path to the file system (block 537). Recalling that only executables for authorized applications have entries in the mirror directory data structure, an successful query on the load path (block 539) means the application that originated the I/O request is authorized (block 543). However, the originating application may shave been spawned by an unauthorized application and is thus, unauthorized. The parent-child data structure is used at block 541 to determine if an originating authorized application is a child of an unauthorized parent application. If so, then this instance of the originating application is designated as unauthorized (block 545). For purposes of this example, processing falls through block 547 and control is returned to the protected execution agent method 500. An unauthorized application spawned by an authorized application is still considered unauthorized, so no check of the parent-child data structure is required when the query at block 539 is unsuccessful.

The creation of the parent-child and the active process data structures is now described. One of skill in the art will immediately recognize that many well-known types of data structures, such as indexed files, data bases, hash tables, etc., are suitable for storing the information required to track the active processes and the parent-child relationships. The underlying support services for the data structures of the present invention may be provided by the file system or by third-party applications as is conventional and the technicalities are therefore not included in the following description.

Returning to the beginning blocks of FIG. 5B, when one application invokes the execution of a second application, such as when Windows 95/98 responds to a double-click on an executable file, the first I/O request issued is an "open" on the executable file for the second application (block 521). A file handle for the executable is extracted from the I/O open request and saved (block 523). The method 520 then continues processing at block 533 as described above.

After the executable file is opened, it must be initialized. When an initialization I/O request is intercepted (block 525), the saved file handle corresponding to the file handle in the request is flagged (block 527) because the next I/O request that contains the same file handle will also contain the directory path for the executable file. Thus, when an I/O request is intercepted that contains a file handle corresponding to a flagged file handle (block 529), the process identifier and directory path are extracted from the I/O request and saved as an entry in the active process data structure (block 531). Processing then continues at block 533 and progresses as described previously until block 547 is reached. Because the I/O request is on a file handle corresponding to a flagged file handle, the test at block 547 is true and the saved file handle is unflagged at block 549. Assuming that the originating application is unauthorized, an entry in the parent-child data structure is created to track the relationship between the originating parent application and the newly-executed child application (block 553). An alternate embodiment that maintains all relationships between parent and children applications in the parent-child data structure can be implemented by eliminating the test at block 551.

The entry in the parent-child data structure can contain the process identifiers for the parent and child applications or any other identifier that uniquely identifies the applications. Additionally, the active process data structure can be keyed on any other identifier that is uniquely associated with the directory path of the executable. Furthermore, it will be readily apparent to one of skill in the art that entries in the active process and parent-child data structures can be deleted or marked as unused using techniques specific to the type of data structure, although such actions are not illustrated in FIG. 5B.

The particular methods performed by a computer to execute one embodiment of the protected execution agent and supporting configuration utility of the invention have been described. The method performed to implement the configuration utility has been shown by reference to a flowchart in FIG. 4, including all the acts from 401 until 417. The methods performed to implement the protected execution agent have been shown by reference to flowcharts in FIGS. 5A-B, including all acts from 501 until 515 and from 521 until 553.

CONCLUSION

A protected execution agent and supporting configuration utility have been described that create and prevent unauthorized modifications to a protected execution environment on a computer, thus preventing the installation of one application from overwriting components and settings required by another application. Thus, the present invention is particularly applicable for a remote support organization in isolating supported applications on a computer from unsupported ones without adversely impacting the user's access to either type of application.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that the protected execution agent could intercept only certain I/O requests, such as open, initialize, find, close, to increase the speed of processing the I/O requests. Furthermore, those of ordinary skill within the art will appreciate that the protected execution agent can be extended to provide backup capabilities by saving copies of files that are being deleted from the protected execution environment.

The terminology used in this application with respect to the operating and file systems is meant to include all such environments that do not automatically isolate user modifications to predetermined areas. Therefore, it is manifestly intended that this invention be limited only by the following claims and equivalents thereof.

What is claimed is:

1. A method of providing a protected execution environment on a computer, the method comprising:
   intercepting an input/output request for a file from an application;
   determining if the application is authorized to modify the protected execution environment;
   creating a null entry in a mirror directory structure for an executable for each application authorized to modify the protected execution environment, wherein determining if the application is authorized to modify the protected execution environment comprises querying the existence of the executable for the application in the mirror directory structure;
   creating a redirected input/output request to an alternate environment when the application is not authorized to modify the protected execution environment and the file is within the protected execution environment; and
   submitting the redirected input/output request to a file system manager.

2. The method of claim 1 further comprising:
   allowing the redirected input/output request to continue when it is intercepted.

3. The method of claim 1 wherein the protected execution environment comprises a directory for each of the applications that is authorized to modify the protected execution environment.

4. The method of claim 1 further comprising:
   categorizing each application installed on the computer as authorized or not authorized to modify the protected execution environment.

5. The method of claim 1 wherein the alternate environment comprises a directory associated with an application that is not authorized to modify the protected execution environment.

6. The method of claim 1 wherein the redirected input/output request specifies a directory in the alternate environment that corresponds to a directory in the protected execution environment specified in the input/output request.

7. The method of claim 1, wherein a parent-child relationship is maintained between an application that invokes another application.

8. The method of claim 1, wherein determining if the application is authorized to modify the protected execution environment comprises:
   designating the application as not authorized to modify the protected execution environment if the application was invoked by another application that is not authorized to modify the protected execution environment.

9. The method of claim 1, further comprising:
maintaining an association between an executing application and a directory path for the executable for the executing application,
wherein querying for the existence of the executable in the mirror data structure comprises:
specifying the directory path for the executable associated with the executing application.

10. A computer-readable medium including instructions which, when executed by a machine, cause the machine to perform the method of claim 1.

11. A method for operating a computer system with a protected execution environment, the method comprising:
executing a configuration utility to categorize a plurality of applications installed on the computer system as authorized or not authorized to modify the protected execution environment;
defining the protected execution environment based on the authorized applications; and
installing a protected execution agent in a file system to intercept input/output requests submitted by the applications, wherein the protected execution agent directs an input/output request to an alternate environment if the application that submitted the request is not authorized and the request is directed to the protected execution environment, wherein the protected execution agent is installed in a hook chain in a file system manager to intercept the input/output requests before the requests are processed by any other agent installed in the hook chain.

12. The method of claim 11 wherein the configuration utility defines at least one of the protected execution environment and the alternate environment when categorizing the plurality of applications.

13. The method of claim 11 wherein the alternate environment is defined based on at least one application that is not authorized.

14. The method of claim 11, wherein the configuration utility further creates a null entry in a mirror directory structure for an executable for each authorized application and the protected execution agent further queries the existence of the executable for an executing application in the mirror directory structure to determine if the application is authorized.

15. The method of claim 14, wherein the protected execution agent further maintains an association between the executing application and a directory path for the executable for the executing application.

16. The method of claim 11, wherein the protected execution agent designates a second application as not authorized if it was invoked by a first application that is not authorized.

17. The method of claim 16, wherein the protected execution agent maintains a parent-child relationship between the first and second applications.

18. The method of claim 11, wherein the configuration utility is executed prior to providing the computer system to a user and the protected execution agent is installed each time the computer system is booted.

19. The method of claim 11, further comprising:
saving a copy of the protected execution environment; and
recovering from a failure of the computer system by replacing the protected execution environment with the copy.

20. The method of claim 19, wherein the copy is saved on the computer system in a secure location.

21. The method of claim 20, wherein the copy is saved on a remote computer server and downloaded to the computer system.

22. A computer-readable medium including instructions which, when executed by a machine, cause the machine to perform the method of claim 11.

23. A system to provide a protected execution environment on a computer, the system comprising means for performing the method of claim 1.

24. A system to provide a protected execution environment on a computer, the system comprising:
an execution agent to:
intercept an input/output request for a file from an application;
determine if the application is authorized to modify the protected execution environment;
create a null entry in a mirror directory structure for an executable for each application authorized to modify the protected execution environment, wherein determining if the application is authorized to modify the protected execution environment comprises querying the existence of the executable for the application in the mirror directory structure;
create a redirected input/output request to an alternate environment when the application is not authorized to modify the protected execution environment and the file is within the protected execution environment; and
submit the redirected input/output request to a file system manager.

* * * * *